(12) United States Patent
Liu et al.

(10) Patent No.: US 10,668,588 B2
(45) Date of Patent: Jun. 2, 2020

(54) FIXTURE FOR MACHINING WHEEL OUTER RIM WITHOUT TRACE

(71) Applicant: CITIC DICASTAL CO., LTD, Qinhuangdao, Hebei (CN)

(72) Inventors: Weidong Liu, Hebei (CN); Xiaoyu Jiang, Hebei (CN); Fengyan Liu, Hebei (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 237 days.

(21) Appl. No.: 16/024,344

(22) Filed: Jun. 29, 2018

(65) Prior Publication Data

US 2019/0224793 A1    Jul. 25, 2019

(30) Foreign Application Priority Data

Jan. 22, 2018    (CN) .......................... 2018 1 0060575

(51) Int. Cl.
| | |
|---|---|
| *B23Q 3/06* | (2006.01) |
| *B23Q 3/00* | (2006.01) |
| *B23C 3/00* | (2006.01) |
| *B21D 53/30* | (2006.01) |

(52) U.S. Cl.
CPC ............... *B23Q 3/062* (2013.01); *B23C 3/00* (2013.01); *B23Q 3/005* (2013.01); *B21D 53/30* (2013.01)

(58) Field of Classification Search
CPC ..................................................... F16C 15/00
USPC ................................ 269/309–310, 900, 901
See application file for complete search history.

(56) References Cited

U.S. PATENT DOCUMENTS

| | | | | |
|---|---|---|---|---|
| 6,205,110 B1 * | 3/2001 | Miyamoto | ............ | F16F 15/363 360/99.08 |
| 6,502,834 B1 * | 1/2003 | Fukui | .................... | B23B 31/201 279/156 |
| 7,117,603 B1 * | 10/2006 | Pellegrino | .............. | G01B 5/255 33/203.18 |
| 7,159,952 B2 * | 1/2007 | Koschel | ................ | B24B 23/028 301/5.22 |

* cited by examiner

*Primary Examiner* — Joseph J Hail
*Assistant Examiner* — Anamika S. Mishty
(74) *Attorney, Agent, or Firm* — IPro, PLLC; Qian Gu

(57) ABSTRACT

A fixture for machining wheel outer rim without trace includes a positioning and clamping portion and a flexible support portion. A base is fixed on a bottom plate, and a screw is configured to compress an expanding pressure plate during being tightened so that the outer circumference of an expanding sleeve expands a center hole of a wheel; and the positioning columns are inserted into bolt holes of the wheel. A lower pressure plate is fixed on the base, and limiting columns and an upper pressure plate are installed on the lower pressure plate, with steel balls and rubber strip being enclosed in a space formed by the lower pressure plate and the upper pressure plate. The fixture meets the requirement for machining the wheel outer rim without trace, has the characteristics of simple structure, convenient manufacture, stable performance and precision, and meets the requirements of automatic production.

2 Claims, 6 Drawing Sheets

FIXTURE FOR MACHINING WHEEL OUTER RIM WITHOUT TRACE

CROSS REFERENCE TO RELATED APPLICATION

This application claims priority to Chinese Patent Application No. 201810060575.0, entitled FIXTURE FOR MATCHING WHEEL OUTER RIM WITHOUT TRACE and filed on Jan. 22, 2018, which is incorporated herein by reference in its entirety and for all purposes.

FIELD OF THE INVENTION

The present invention relates to a machining device, specifically to a fixture capable of realizing once-forming of a wheel outer rim in a wheel machining process without machining traces.

BACKGROUND OF THE INVENTION

In the wheel machining industry, wheel balance degree is an important factor affecting the comfort and the safety of an automobile and is a 100% test item. At the same time, the rejection rate of wheel balance out of tolerance is an important factor affecting the wheel yield. By research and analysis, the wheel balance out of tolerance may be caused by many factors, wherein the outer rim machining traces formed in the first and second procedures of the wheel machining process are the key factor of balance out of tolerance. The fixture of the present invention not only can realize no machining trace on a wheel outer rim and improve the balance precision of the wheel, but also can improve the machining effect on the outer rim.

SUMMARY OF THE INVENTION

The aim of the present invention is to provide a fixture for machining wheel outer rim without trace.

In order to fulfill the above aim, the technical solution of the present invention comprises a fixture for machining wheel outer rim without trace according to the present invention, comprising a bottom plate, a base, a lower pressure plate, a rubber strip, steel balls, an upper pressure plate, limiting columns, a flange, an expanding sleeve, an expanding pressure plate, positioning columns, a screw, a nylon pressure plate, a spacer and a lock nut.

The base is fixed on the bottom plate, the positioning columns are installed on the base through the flange, and the screw can compress the expanding pressure plate during being tightened so that the outer circumference of the expanding sleeve expands a center hole of a wheel; the positioning columns are inserted into bolt holes of the wheel to realize circumferential positioning of the wheel; the nylon pressure plate and the spacer are installed on the screw by means of the lock nut, and the nylon pressure plate compresses the front side of the wheel by means of the spacer during the tightening of the lock nut. The above constitutes a positioning and clamping portion.

The lower pressure plate is fixed on the base, and the limiting columns and the upper pressure plate are installed on the lower pressure plate, with the steel balls and the rubber strip being enclosed in a space formed by the lower pressure plate and the upper pressure plate. A protrusion structure A and a protrusion structure B are formed on the upper end face of the outer portion of the lower pressure plate, and a protrusion structure C and a protrusion structure D are correspondingly formed on the lower end face of the outer portion of the upper pressure plate, with the outer protrusion structure B on the lower pressure plate and the outer protrusion structure D on the upper pressure plate forming a jaw A, and the inner protrusion structure A on the lower pressure plate and the inner protrusion structure C on the upper pressure plate forming a jaw B. The rubber strip is enclosed in a annular groove formed by the jaw A and the jaw B, and can move radially in the groove; three groups of steel balls are enclosed inside the jaw B and are separated by three limiting columns therebetween to avoid moving circumferentially during operation. The above constitutes a flexible support portion.

In operation, as the wheel rotates at a high speed, the steel balls are thrown outwardly by the centrifugal force, and thus drive the rubber strip to move outwardly to compress the inner rim of the wheel, thereby counteracting part of the acting force of a turning tool on the wheel, and at the same time, allowing the vibration of the wheel to be effectively eliminated, and the problem of tool vibration to be eliminated, so that once-forming of the outer rim can be realized.

A bevel structure is formed on the upper end face of the outer portion of the lower pressure plate. After the operation is completed, the steel balls roll inwardly under the action of self-weight and thus disengage from the rubber strip to facilitate removal of the wheel.

Before actual use, the screw, the expanding pressure plate, the nylon pressure plate, the spacer and the lock nut are detached. In actual use, the wheel is vertically placed on the fixture, and the expanding sleeve and the positioning columns are respectively placed into the center hole and the bolt holes of the wheel, with a tiny clearance being reserved between the rubber strip and the inner rim of the wheel. Then the screw is tightened, and by means of the compression of the expanding pressure plate on the expanding sleeve, the expanding sleeve moves down and thus expands the center hole of the wheel. Next, the nylon pressure plate, the spacer and the lock nut are successively installed on the screw, then the lock nut is locked, and thus the nylon pressure plate compresses the front side of the wheel, and the wheel positioning operation is completed. Then, as the wheel rotates at a high speed, the steel balls are thrown outwardly by the centrifugal force, and thus drive the rubber strip to move outwardly to compress the inner rim of the wheel. Then the machining of the wheel outer rim with a machine tool begins. The flexible support structure can counteract part of the acting force of a turning tool on the wheel, and at the same time, can effectively eliminate vibration of the wheel and eliminate the problem of tool vibration, so that the outer rim can be machined without trace, and the wheel balance rejection rate is reduced.

The fixture can meet the requirement for machining wheel outer rim without trace, has the characteristics of simple structure, convenient manufacture, stable performance and precision that can meet the machining requirement, and can meet the requirements of automatic production.

BRIEF DESCRIPTION OF THE DRAWINGS

FIG. 2a is a side elevational view and FIG. 2b is a top plan view of rubber strip, steel balls and limiting columns in the fixture for machining wheel outer rim without trace of the present invention;

Figure 1:
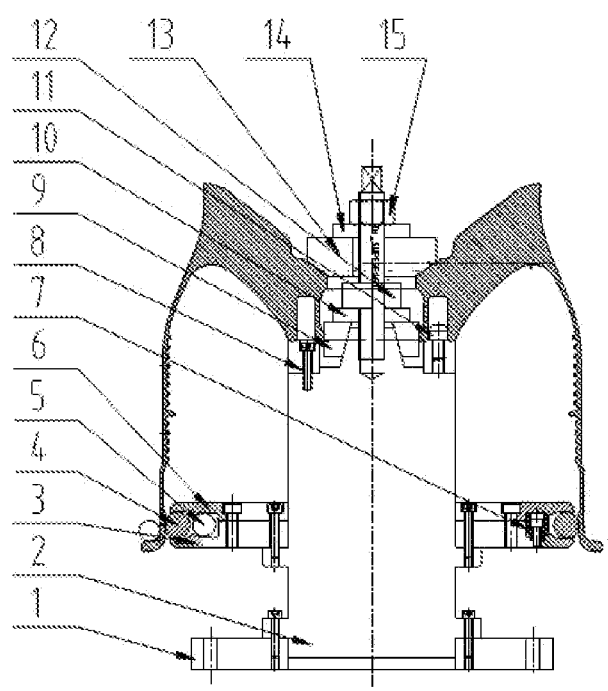
FIG. 1 is a side elevational view of a fixture for machining wheel outer rim without trace of the present invention.

In the drawings, 1—bottom plate, 2—base, 3—lower pressure plate, 4—rubber strip, 5—steel ball, 6—upper pressure plate, 7—limiting column, 8—flange, 9—expanding sleeve, 10—expanding pressure plate, 11—positioning column, 12—screw, 13—nylon pressure plate, 14—spacer, 15—lock nut.

DETAILED DESCRIPTION OF THE PREFERRED EMBODIMENTS

The details and working conditions of the specific device according to the present invention will be described in detail below in combination with the drawings.

Figure 2B:
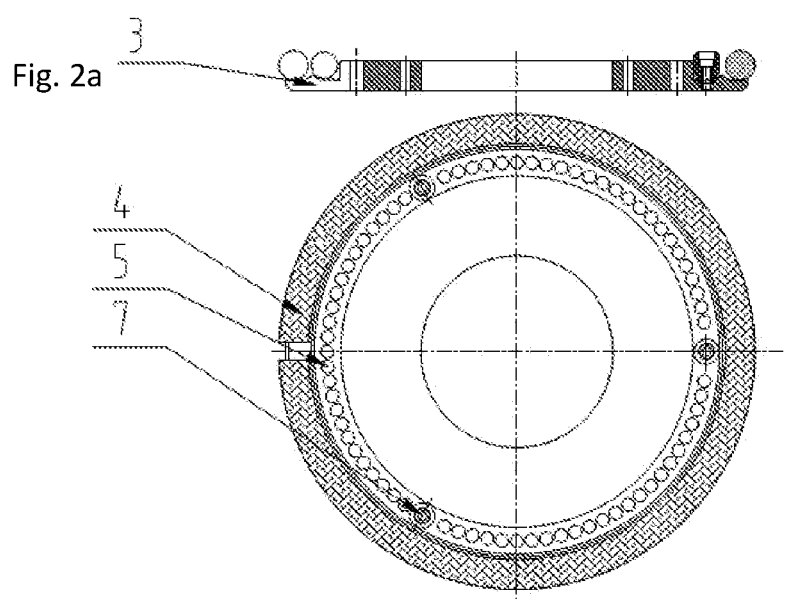
Figure 3:
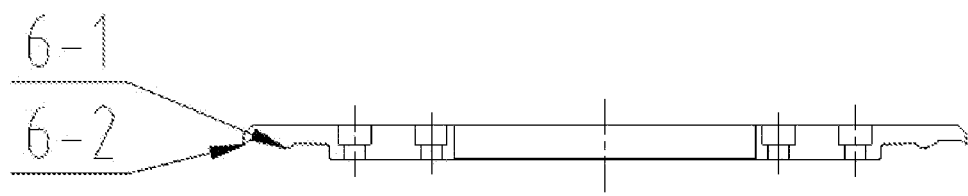
FIG. 3 is a side elevational view of an upper pressure plate in the fixture for machining wheel outer rim without trace of the present invention.
Figure 4:
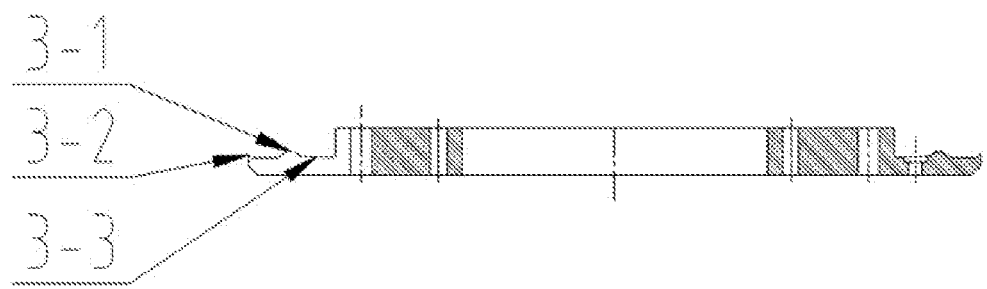
FIG. 4 is a side elevational view of a lower pressure plate in the fixture for machining wheel outer rim without trace of the present invention.
Figure 5:
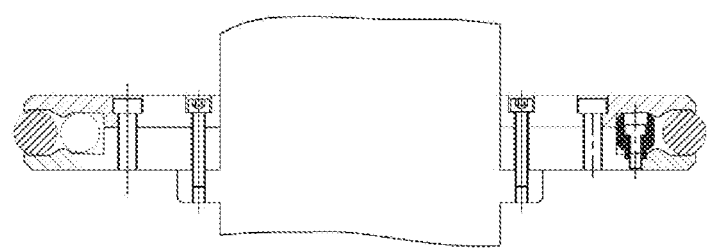
FIG. 5 is a side elevational view of a flexible support structure in the fixture for machining wheel outer rim without trace of the present invention.
Figure 6:
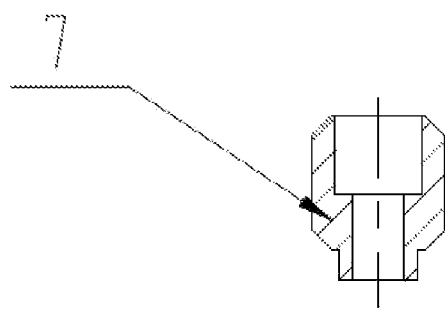
FIG. 6 is a side elevational view of a limiting column in the fixture for machining wheel outer rim without trace of the present invention.

As shown in FIGS. 1-6, a fixture for machining wheel outer rim without trace according to the present invention comprises a bottom plate 1, a base 2, a lower pressure plate 3, a rubber strip 4, steel balls 5, an upper pressure plate 6, limiting columns 7, a flange 8, an expanding sleeve 9, an expanding pressure plate 10, positioning columns 11, a screw 12, a nylon pressure plate 13, a spacer 14 and a lock nut 15.

The base 2 is fixed on the bottom plate 1, the positioning columns 11 are installed on the base 2 through the flange 8, and the screw 12 can compress the expanding pressure plate 10 during being tightened so that the outer circumference of the expanding sleeve 9 expands a center hole of a wheel; the positioning columns 11 are inserted into bolt holes of the wheel to realize circumferential positioning of the wheel; the nylon pressure plate 13 and the spacer 14 are installed on the screw 12 by means of the lock nut 15, and the nylon pressure plate 13 compresses the front side of the wheel by means of the spacer 14 during the tightening of the lock nut 15. The above constitutes a positioning and clamping portion.

The lower pressure plate 3 is fixed on the base 2, the limiting columns 7 and the upper pressure plate 6 are installed on the lower pressure plate 3, and the steel balls 5 and the rubber strip 4 are enclosed in a space formed by the lower pressure plate 3 and the upper pressure plate 6. A protrusion structure A3-1 and a protrusion structure B3-2 are formed on the upper end face of the outer portion of the lower pressure plate 3, and a protrusion structure C6-1 and a protrusion structure D6-2 are correspondingly formed on the lower end face of the outer portion of the upper pressure plate 6, with the outer protrusion structure B3-2 of the lower pressure plate 3 and the outer protrusion structure D6-2 of the upper pressure plate 6 forming a jaw A, and the inner protrusion structure A3-1 of the lower pressure plate 3 and the inner protrusion structure C6-1 of the upper pressure plate 6 forming a jaw B. The rubber strip 4 is enclosed in an annular groove formed by the jaw A and the jaw B, and can move radially in the groove; three groups of steel balls 5 are enclosed inside the jaw B and are separated by three limiting columns 7 therebetween to avoid moving circumferentially during operation. The above constitutes a flexible support portion.

In operation, as the wheel rotates at a high speed, the steel balls 5 are thrown outwardly by the centrifugal force, and thus drive the rubber strip 4 to move outwardly to compress the inner rim of the wheel, thereby counteracting part of the acting force of a turning tool on the wheel, and at the same time, allowing the vibration of the wheel to be effectively eliminated and the problem of tool vibration to be eliminated, so that once-forming of the outer rim can be realized.

A bevel structure 3-3 is formed on the upper end face of the outer portion of the lower pressure plate 3. After the operation is completed, the steel balls 5 roll inwardly under the action of self-weight and thus disengage from the rubber strip 4 to facilitate removal of the wheel.

Before actual use, the screw 12, the expanding pressure plate 10, the nylon pressure plate 13, the spacer 14 and the lock nut 15 are detached. During actual use, the wheel is placed vertically on the fixture, and the expanding sleeve 9 and the positioning columns 11 are respectively placed into the center hole and the bolt holes of the wheel, with a tiny clearance being reserved between the rubber strip 4 and the inner rim of the wheel. Then the screw 12 is tightened, and by means of the compression of the expanding pressure plate 10 on the expanding sleeve 9, the expanding sleeve 9 moves down, and thus expands the center hole of the wheel. Next, the nylon pressure plate 13, the spacer 14 and the lock nut 15 are successively installed on the screw 12, then the lock nut 15 is locked, and thus the nylon pressure plate 13 compresses the front side of the wheel, and the wheel positioning operation is completed. Then, as the wheel rotates at a high speed, the steel balls 5 are thrown outwardly by the centrifugal force, and thus drive the rubber strip 4 to move outwardly to compress the inner rim of the wheel. Then it begins to machine the outer rim of the wheel with a machine tool. The flexible support structure can counteract part of the acting force of a turning tool on the wheel, and at the same time, can effectively eliminate vibration of the wheel and eliminate the problem of tool vibration, so that the outer rim can be machined without trace and the wheel balance rejection rate is reduced.

The invention claimed is:

1. A fixture for machining wheel outer rim without trace, comprising a bottom plate, a base, a lower pressure plate, a rubber strip, steel balls, an upper pressure plate, limiting columns, a flange, an expanding sleeve, an expanding pressure plate, positioning columns, a screw, a nylon pressure plate, a spacer and a lock nut, wherein the fixture for machining wheel outer rim without trace comprising:

a positioning and clamping portion, wherein the base is fixed on the bottom plate, the positioning columns are installed on the base through the flange, and the screw is configured to compress the expanding pressure plate during tightening so that an outer circumference of the expanding sleeve expands a center hole of a wheel; the positioning columns are inserted into bolt holes of the wheel to realize circumferential positioning of the wheel; the nylon pressure plate and the spacer are installed on the screw via the lock nut, and the nylon pressure plate compresses a front side of the wheel via the spacer during tightening of the lock nut; and a flexible support portion, wherein the lower pressure plate is fixed on the base, the limiting columns and the upper pressure plate are installed on the lower pressure plate, with the steel balls and the rubber strip being enclosed in a space formed by the lower pressure plate and the upper pressure plate; an outer protrusion structure and an inner protrusion structure are formed on a upper end face of an outer portion of the lower pressure plate, an outer protrusion structure and an inner protrusion structure are correspondingly formed on a lower end face of an outer portion of the upper pressure plate, with the outer protrusion structure on the lower pressure plate and the outer protrusion structure on the upper pressure plate forming an outer jaw, and the inner protrusion structure on the lower pressure plate and the inner protrusion structure on the upper pressure plate forming an inner jaw; the rubber strip is enclosed in a annular groove formed by the outer jaw and the inner jaw and is configured to move radially in the groove; three groups of the steel balls are enclosed inside the inner jaw and are separated by three limiting columns therebetween to avoid moving circumferentially during operation, as the wheel rotates at a high speed during operation, the steel balls are thrown outwardly by a centrifugal force, and thus drive the rubber strip to move outwardly to compress an inner rim of the wheel.

2. A fixture for machining wheel outer rim without trace according to claim 1, wherein a bevel structure is formed on the upper end face of the outer portion of the lower pressure plate, and after the operation is completed, the steel balls roll inwardly under an action of self-weight and thus disengage from the rubber strip to facilitate removal of the wheel.

* * * * *